United States Patent [19]

Spink

[11] Patent Number: 5,912,763
[45] Date of Patent: Jun. 15, 1999

[54] STEREOMICROSCOPE INCLUDING A CAMERA FOR RECEIVING DIFFERENT IMAGES AT DIFFERENT TIME INTERVALS

[75] Inventor: Roger Spink, Berneck, Switzerland

[73] Assignee: Leica Mikroskopie Systeme AG, Heerbrugg, Switzerland

[21] Appl. No.: 08/875,738

[22] PCT Filed: Feb. 1, 1996

[86] PCT No.: PCT/EP96/00406

§ 371 Date: Aug. 4, 1997

§ 102(e) Date: Aug. 4, 1997

[87] PCT Pub. No.: WO96/24083

PCT Pub. Date: Aug. 8, 1996

[30] Foreign Application Priority Data

Feb. 3, 1995 [CH] Switzerland .................. 303/95

[51] Int. Cl.[6] ............. G02B 21/18; G02B 21/22; G02B 21/36
[52] U.S. Cl. ............. 359/363; 359/372; 348/49; 348/79
[58] Field of Search .................. 359/363, 369, 359/372, 376, 377; 348/49, 79

[56] References Cited

U.S. PATENT DOCUMENTS 5,835,264 11/1998 Tandler et al. .................. 359/377

FOREIGN PATENT DOCUMENTS 4243452 6/1994 Germany .
1-319721 12/1989 Japan .

*Primary Examiner*—Jon Henry
*Attorney, Agent, or Firm*—Foley & Lardner

[57] ABSTRACT

A stereomicroscope has light beams of two separate radiation paths passing through two partial pupils directed into a common lens system by at least two mirrors arranged on the level of the pupils. The partial beams are superimposed with the partial pupils spatially separated at the level of the pupils. A separating device with at least one movable diaphragm or at least one tilted mirror, stationary or adjustable along a common axis, provides undistorted images from both partial beams toward at least one image pick-up device. The movable diaphragm shields the partial beams alternately at the level of one of the pupils or the tilted mirror is arranged at the level of the pupils so that both partial beams can be retransmitted separately.

11 Claims, 5 Drawing Sheets

STEREOMICROSCOPE INCLUDING A CAMERA FOR RECEIVING DIFFERENT IMAGES AT DIFFERENT TIME INTERVALS

The invention relates to a stereomicroscope according to claim 1.

Stereomicroscopes which have geometric superimposition and/or an essentially common beam path for the right and left partial image are already known. These known stereomicroscopes have the advantage that only one magnification unit (zoom, lens turret) is necessary for two stereomicroscope beam paths. Correspondingly, mutual adjustment of the left and right optical systems is also dispensed with.

In order to prevent light from both the partial images passing simultaneously to the common image pick-up device, use is made, for example, of variously polarized light for the two partial images, so that a polarization-dependent beam splitter in each case permits the desired partial image or light with the desired polarization to pass to the image pick-up device. Solutions of this type are complicated and severely attenuate the light intensity in an undesired manner. In order to reduce only minimally the light intensity of the two partial images passing alternately to the image pick-up device, solutions have been developed in which a moving reflective surface alternately introduces a partial image into the common beam path and covers the other (cf. CH Patent Application No. 1525/94-0) However, moving mirrors have the disadvantage that the precise alignment of the same is impaired as a result of the mobility, and that the inertial forces acting on the movement device are so high because of the mirror mass that the movement device has to be designed and fastened in a rugged manner.

The object according to the invention consists then in finding a beam superimposing arrangement which, using simple components and having as small a light loss as possible, supplies the left and the right partial image to an image pick-up device through a common optical system in an undistorted manner.

The solution according to the invention provides that the two stereoscopic partial beam paths, or the left and the right beam path, have spatially at least partially separate partial pupils, at least in a partial region of the common beam path. To this end, preferably directly after the main objective as viewed from the object the two partial beam paths, which essentially run parallel to each other, are deflected along a common axis by at least two mirrors. The arrangement of the mirrors is selected in such a way that, from the two partial beams or from their partial pupils, having centers of gravity to the side of the axis of the common beam path, bundles of light which are spatially separated in pupil planes propagate in the common beam path. From the mirrors, at most the light of half the pupil of each partial beam is introduced into the common beam path.

To make only the light of one partial beam path come to an image pick-up device it is necessary to use neither a beam splitter nor a rotating mirror, but merely a separating device having at least one movable diaphragm, or at least one deflecting mirror which is essentially fixed or adjustable, for example along the common axis. The at least one movable diaphragm has to cover the partial beams alternately, so that one partial beam is essentially completely interrupted as long as an appreciable proportion of light from the other beam path is passing through the diaphragm. To this end, said diaphragm is arranged either in the region having separate partial beam paths, or else in the common beam path in regions of pupil planes. Correspondingly, in the case of embodiments having at least one deflecting mirror, at least one of these mirrors is arranged in one pupil plane in such a way that a partial beam path is coupled out of the common optical system or of the common beam path. Since the pupil planes can be displaced during the adjustment of the common optical system, a control means and an adjusting device are preferably provided, which ensure that the diaphragm or the deflecting mirror is located essentially in one pupil plans in the common beam path.

Since the partial pupils or the bundles of light of the partial beams are arranged spatially separated in pupil planes, preferably located opposite each other on either side of the optical axis of the common beam path, it is possible for example for the partial pupil of the right beam path to be essentially completely covered by the diaphragm, whereas at least part of the partial pupil of the left beam path remains free. The image pick-up device receives a complete image of the left stereo base, the intensity thereof being reduced, however, since only the light of a partial pupil or of the bundle of light not covered by the diaphragm passes to be imaged.

The diaphragm comprises at least one movable part. In the sense of the invention, it is not significant in this case in what form the diaphragms are introduced. Translatory movements are to be treated as equivalent to rotating movements or other switching movements. If appropriate, the movable part is able to be displaced essentially in parallel fashion between a first and a second position, the part being located, for example in the first position, in the region of the right beam path or of the bundle of light of the right beam, but essentially not impairing left partial beam. In the second position, the left partial beam or its bundle of light is correspondingly covered and the light from the right beam passes to the image pick-up device. Preferred diaphragms comprise at least one part rotating about a diaphragm axis, the part comprising at least one covering region and one passage region, so that during one revolution a covering phase and a passage phase occur for at least one partial beam or bundle of light. It is intended, for example, for essentially halves of the common beam path to be covered alternately. In the case of using a single rotating part, which has an axis of rotation with at least one component along the optical axis of the common beam path, for example in the case of using a rotating half disk, during each rotation light from both partial pupils passes simultaneously, phase by phase, to the image pick-up device, which is not desirable.

In order to prevent light passing to the image pick-up device from both stereoscopic partial beams, for example a semicylinder or a part thereof is rotated about a diaphragm axis of rotation in the common beam path in such a way that always at least the bundle of light of the one beam path is covered. To this end, the diaphragm axis of rotation is essentially at right angles to the optical axis of the common beam path and is essentially a central perpendicular of the connecting line between the centers of the two partial pupils in a normal plane of the optical axis. Preferably, the cylinder diameter is selected to be larger than the beam diameter, and the aperture angle of the cylindrical part is at least sufficiently large that, in two positions which are mirror-symmetrical in relation to the axis of rotation, it covers at least just the entire beam path.

In a preferred embodiment, the diaphragm comprises a first and a second part which can be rotated about a first and second axis of rotation. The two parts are essentially constructed as partial disks or partial cones or partial cylinders, with a passage angle region and a covering angle region as seen from the respective axis of rotation. The two axes of rotation are in this case arranged in such a way that the first part alternately covers and allows through the bundle of light from the right partial beam, and the second part alternately covers and allows through the bundle of light from the second partial beam. If the passage angle region is preferably selected to be smaller than the covering angle region, it is possible for the two parts to rotate in synchronism with each other in such a way that one partial beam is completely interrupted as long as also only a small proportion of light of the other partial beam is also passing through the diaphragm. If appropriate, fixed diaphragm elements are provided in the edge regions of the rotating diaphragm parts.

In a preferred variant, the entry bundles of rays of the stereomicroscope are alternately covered and allowed through at the (single) main objective by means of a rotating diaphragm having at least in each case a passing and a blocking partial region, with the result that they are deflected into the common beam path one after another in time by the two mirrors.

Instead of the mechanically moved diaphragms, other types of diaphragms could also be employed, provided only that they are capable of changing one hundred percent between a passing and blocking state.

Embodiments are also provided in which, instead of the diaphragm, at least one separating mirror is provided in the common beam path. It goes without saying that, instead of a mirror, it is also possible to employ any desired other deflecting element, such as for example a prism, as the separating element. The at least one separating mirror is arranged in a region having only one pupil, for example that of the right partial beam, so that the bundle of light of this partial beam is deflected out of the common beam path. If appropriate, it must be possible for this separating mirror to be displaced somewhat along the axis of the common optical system, so that it is always located in the region of one pupil plane, even when the optical system is adjusted. The problems which accompany this adjustability are much smaller than the problems associated with rotating or opening and closing mirrors according to the prior art. The light of the two partial beams is then not led alternately to a common image pick-up device, but rather two image pick-up devices are arranged in such a way that each receive the light of a partial beam in an uninterrupted manner.

Since in the case of all diaphragms which are pushed in or rotated in the effect of the moving diaphragm can be disadvantageous under certain circumstances for recordings on a common image pick-up device, for example a CCD, the embodiment which provides at least one separating mirror instead of a moving diaphragm is particularly advantageous in relation to image disturbances. In addition, contemporaneous images of the two stereoscopic beam paths are always present, and can then for example be superimposed to produce a three-dimensional image on a display. If required, it is in particular also possible for the phase position to be determined and processed or displayed.

In the case of the preferred solution, a superimposing mirror is assigned to each of the two partial beams directly at the main objective. It goes without saying that, instead of a mirror, use can also be made of any desired other deflecting element, such as for example a prism, as the superimposing element. The two superimposing mirrors are aligned in parallel and are arranged offset in relation to one another both in the direction along the optical axis of the common beam path and also in a direction transverse to this axis. The common beam path begins at the first superimposing mirror, since there the light coming from the second superimposing mirror is propagated laterally, past the first superimposing mirror, together with the light from the first superimposing mirror, along the optical axis of the common beam path. Since at least the first superimposing mirror, but preferably also the second superimposing mirror, is located in the region of one pupil plane, a partial pupil from each partial beam passes into the common beam path. Therefore, at the end of the common beam path, a complete image from each partial beam can be displayed, although with reduced intensity. The two partial pupils are arranged in the common beam path, as at the start or at the first mirror, preferably symmetrically on each side of the common optical axis.

Provision is preferably made for the stereo base to be adjustable by means of a parallel displacement of at least one superimposing mirror. If appropriate, in this arrangement the main objective is displaced in a parallel fashion such that the two pupils of the stereoscopic partial beams are essentially arranged symmetrically with respect to the axis of the main objective. The greatest possible adjustability of the stereo base is made possible by an embodiment in which two parallel mirrors are arranged at the main objective, of which at least one can be displaced in parallel fashion in the direction of the axis of the common beam path. The largest stereo base or the largest distance between the pupils of the two partial beams is achieved by means of the arrangement of the mirrors in mutually opposite edge regions of the main objective. The smallest stereo base, or only one beam path, is obtained if the two mirrors adjoin one another along a parting line through the axis of the common beam path. In a preferred embodiment, this parting line lies in the plane which is defined by the axis of the main objective and the axis of the common beam path.

In the case of using only one superimposing mirror in each case, the two separate partial beam paths are constructed asymmetrically and therefore have different lengths as far as the common beam guidance. This results in a phased shift between the partial beams running in parallel in the common beam path. If it is intended to use the phase information, the separate beam paths are constructed to be equally long, preferably symmetrical. To this end, for example at the main objective, two mirrors are arranged symmetrically in relation to the axis of the main objective, so that the partial beams after the mirrors are directed toward each other and can be introduced in parallel into the common beam path by means of at least one further mirror. The two mirrors, from which the light enters into the common beam path, must be essentially in the region of one pupil plane, in order that the partial bundles of light reduce only the light intensity of the images and not the image detail or the field stop.

The light intensity of each partial beam is reduced to one half, since at most half the pupil of each partial beam is used. However, it has been shown that the maximum possible light intensity in the case of the solution according to the invention, using bundles of light which are superimposed in time in the common optical system but are spatially separated in pupil planes, is higher than in the case of partial beams which are polarized, superimposed and separated upstream of the image pick-up device by means of polarization-dependent beam splitters.

Solutions in which moving mirrors alternately lead the light of an entire pupil of each partial beam into the common optical system have a light intensity which is essentially twice as large as solutions according to the invention having partial pupils of the two partial beam paths which are additionally alternately covered. However, in the solution according to the invention, no moving mirrors are provided, so that its structure is significantly simpler and thus more advantageous. Moreover, embodiments according to the invention are provided in which the partial beams are not imaged alternately onto a common image pick-up device but are imaged uninterruptedly onto separate image pick-up devices. Since the light intensity which can be realized in the case of alternating partial-beam imaging is reduced at least by one half because of the time factor, in the case of an uninterrupted display of half-pupils it is essentially possible to achieve the same light intensity as in the case of the solution using moving mirrors.

The solutions according to the invention make it possible to pick up the two stereoscopic images with a small light loss, using simple components. Both rotating diaphragms and also substantially fixed mirrors are constructed and able to be used in a distinctly simpler manner than moving mirrors.

The observer sees a 3-D image. As a result, it is advantageously possible, for example, for magnetic resonance stereo images to be superimposed on the images currently seen. In the case of using such a stereomicroscope as a surgical microscope, this yields special advantages for the surgeon, especially since he can better interpret the image seen. On the other hand, the images reflected in could also contain other information, for example about the control of devices or of the microscope itself. In this conjunction, reference is made to the following Swiss patent applications, the content of which is also considered to be disclosed within the context of this invention: CH 3890/93-3; CH 135/94-3; CH 198.94-5; CH 949/94-2. A combination of the teachings of these applications with the present application is particularly appropriate.

The invention has been described in particular in conjunction with a stereomicroscope. In the widest sense, however, it can also be appropriately used with any other stereoscopic beam paths. To this extent, the claims are also to be interpreted correspondingly broadly Further details and embodiments of the invention emerge from the drawing, in which the figures illustrate the following:

The invention is not restricted to the exemplary embodiments illustrated. Further desired variants may be constituted, above all in combination with the teachings of the Swiss patent applications listed above. Thus, not only are rotational and translatory movements conceivable for the diaphragm, but also stationary electro-optical diaphragms having a one hundred percent switchover capacity and without a loss of light intensity in the passage region are conceivable, as are mechanical diaphragms which can be pivoted in and out. The mirrors used can also in many cases be replaced by prisms acting in a similar way. All these variants are covered by what is disclosed by this application.

Figure 1:
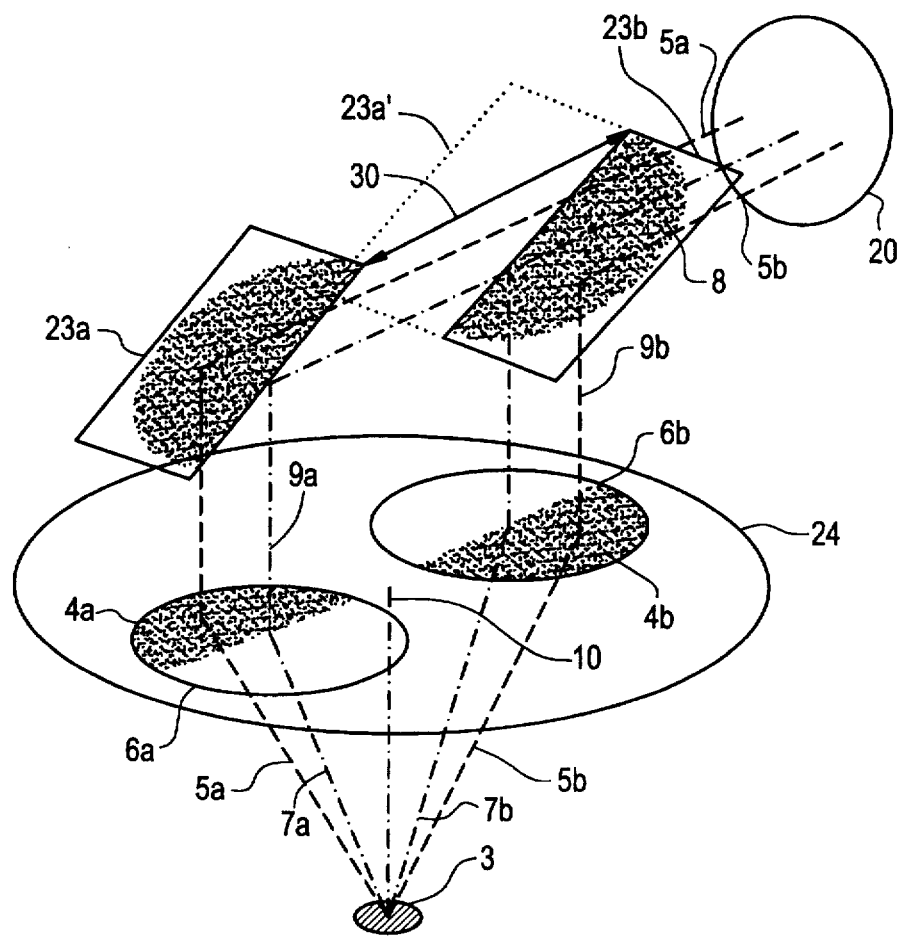
FIG. 1 shows a perspective general illustration of an arrangement having a main objective and two mirrors, in which the light from two partial pupils which are offset laterally in relation to the axis of the common optical system passes into the common optical system.

FIG. 1 shows an arrangement having a main objective 24 and two superimposing mirrors 23a,b, in which the light passes from two partial pupils, which are offset to either side of an axis 8 of the common optical system, into the common optical system. The light from partial pupils 4a, 4b which is reflected at the mirrors 23a and 23b, the said partial pupils being drawn in the region of the main objective 24, thus passes to the common optical system through a first lens 20. Since there is essentially parallel beam propagation between the main objective 24 and the lens 20, the mirrors 23a and 23b are also located in the region of pupil planes. The two partial pupils 4a, 4b, which are introduced simultaneously into a common beam path, contain the image information from two stereoscopic partial beam paths. In the case of a stereomicroscope according to the prior art, this image information is led to an image pick-up device via a common optical system, for example by means of the alternating imaging of the entire pupils 6a, 6b of the left and of the right beam path.

A stereo base results from the fact that an object 3 is observed via two partial beams which are inclined differently in relation to the axis 10 of the main objective and have the axes 7a, 7b. From the main objective 24, the two partial beams pass along the axes 9a and 9b, respectively, and 8 into the common optical system. The partial pupils used for the imaging are constructed around the central rays 5a, 5b which are drawn in for the purpose of clarification. Because only partial pupils pass into the common optical system, it is not the field stop of the two stereoscopic images which is changed but merely their brightness, which is reduced essentially uniformly over the entire image.

The two mirrors 23a, 23b deflect the partial beams such that their two axes 9a and 9b are refracted into the axis 8. In this case, the angle between the axes 9a, 9b and the axis 8 is preferably 90°. The superimposing of the two partial pupils 4a, 4b in the common optical system is effected as a result of the fact that the two mirrors 23a, 23b are arranged on mutually opposite sides of the axis 8, directly adjacent to the latter. In the embodiment illustrated, the mirror edge lines at the axis 8 lie in a plane defined by the axes 8 and 10. As a result of the displaceability 30 of at least one mirror, the stereo base is adjustable. The maximum distance between the imaged partial pupils 4a, 4b is restricted by the extent of the main objective. Since the two mirrors 23a, 23b can also be arranged alongside each other as a result of the displacement 30, the stereo base can be reduced down to zero. In the process, the two partial pupils supplement each other to form a complete pupil of one beam path.

Figure 2:
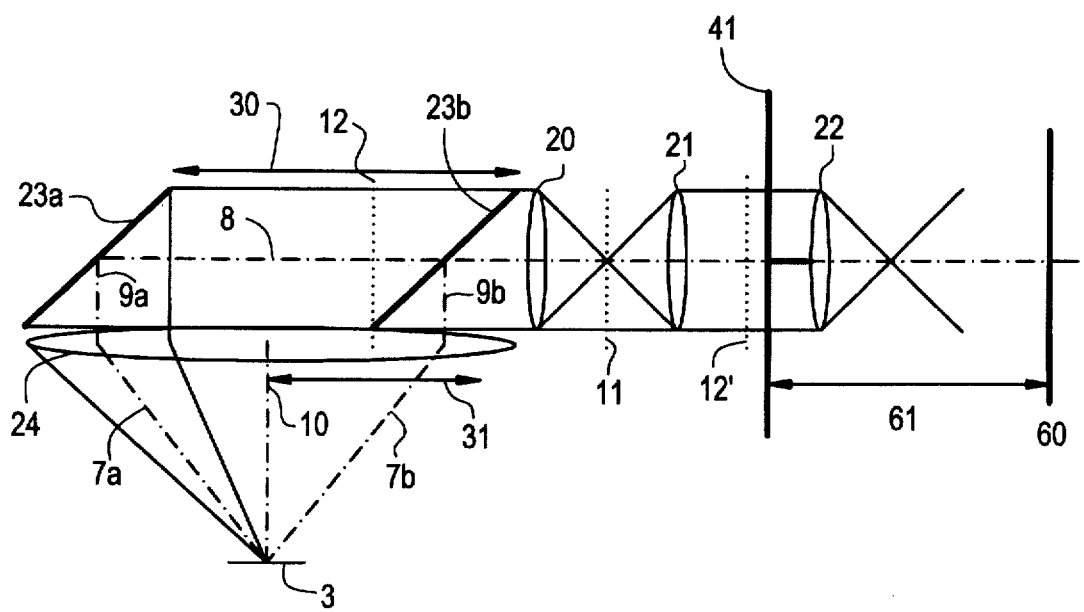
FIG. 2 shows a side view of an arrangement having a main objective, two mirrors, a movable diaphragm and an image pick-up device.

FIG. 2 shows the arrangement according to FIG. 1 in a sectional illustration. In addition, the displaceability 31 of the main objective 24 perpendicular to the axis 10 is drawn in. This movement of the main objective is preferably executed, when adjusting the stereo base, in such a way that the pupils of the two partial beams in the region of the main objective are arranged essentially always symmetrically in relation to the axis 10.

In FIG. 2, three lenses 20, 21, 22 are illustrated to indicate the common optical system. The pupil planes 12 lying in the region of the parallel beam path are assigned conjugate pupil planes in the common optical system. It goes without saying that intermediate image planes 11 can also occur in the common optical system. For instance, a conjugate pupil plane 12' is drawn in the region of the parallel beam path, between the lenses 21 and 22. A diaphragm device 41, which alternately covers the partial pupils of one partial beam and exposes that of the other partial beam in a conjugate pupil plane 12' ensures that the image pick-up device 60 is alternately supplied with undistorted images via in each case only one of the two stereoscopic partial beams. In order to synchronize the covering procedure of the diaphragm with the image pick-up, a synchronization device 61 is preferably connected to the diaphragm 41 and to the image pick-up device 60.

Figure 3:
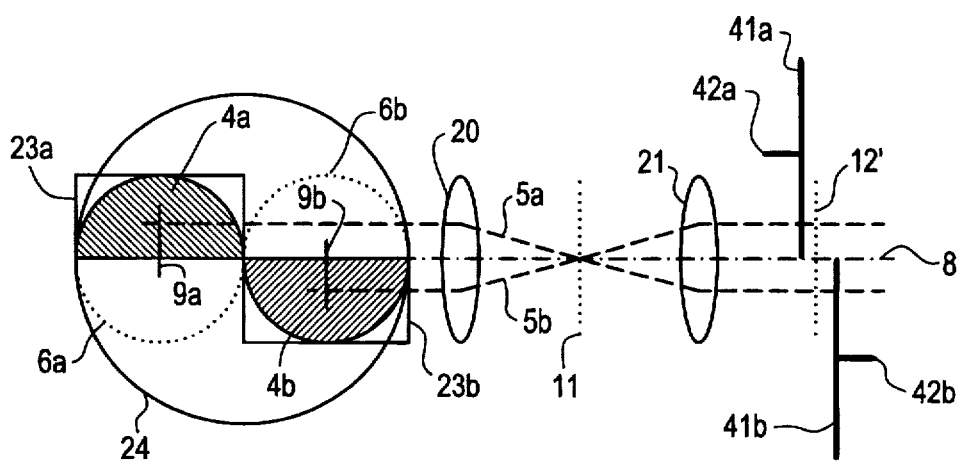
FIG. 3 shows a plan view of an arrangement having a main objective, two mirrors and two movable diaphragms.

FIG. 3 shows a plan view of the arrangement according to FIG. 1, in which there is arranged down-stream of the diaphragm 21, in the region of a conjugate pupil plane 12', a diaphragm device having two disks 41a and 41b which rotate about axes of rotation 42a, 42b, each of which disks include at least one passage region and one covering region. It can be clearly seen in this view that the two disks 41a, 41b are able to cover each of mutually opposite cross-sectional halves of the common beam path. In these two cross-sectional halves, the central rays 5a and 5b each lead through one of the two disks. The fact that the bundle of light or the partial pupil of one stereoscopic partial beam is covered by the covering region of one disk, and the bundle of light or the partial pupil of the other partial beam passes through the passage region of the other disk, ensures that one and only one partial image passes to the image pick-up device.

Figure 4:
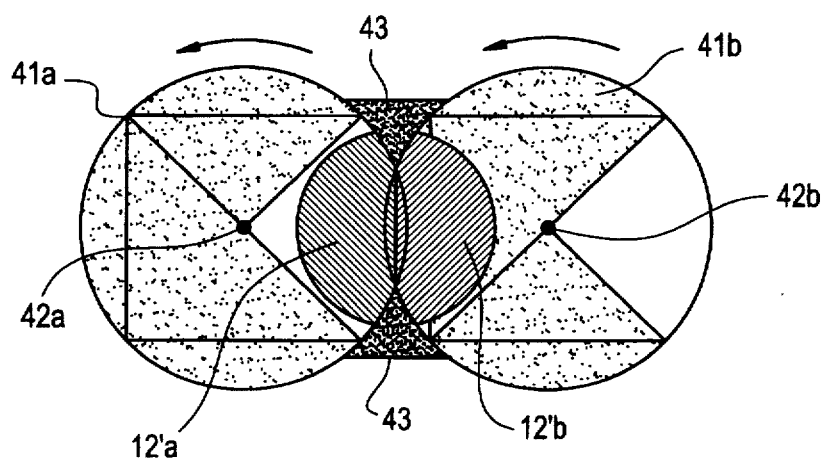
FIG. 4 shows a diaphragm having two rotatable diaphragm parts.

According to FIG. 4, approximately one quarter of each disk is constructed as a passage region and approximately three quarters of each disk as a covering region. If the two disks rotate in parallel and with the same phase, essentially always one partial pupil is completely covered. The ratio between the covering region and passage region depends on the distance of the axes of rotation from the optical axis 8 and on the size of the cross-sectional region. The covering region must comprise at least half the disk and twice the angular range at which the entire beam path appears, proceeding from the axis of rotation. The upper and lower edge regions which cannot be covered by the disks are preferably covered by fixed diaphragm parts 43.

Figure 5:
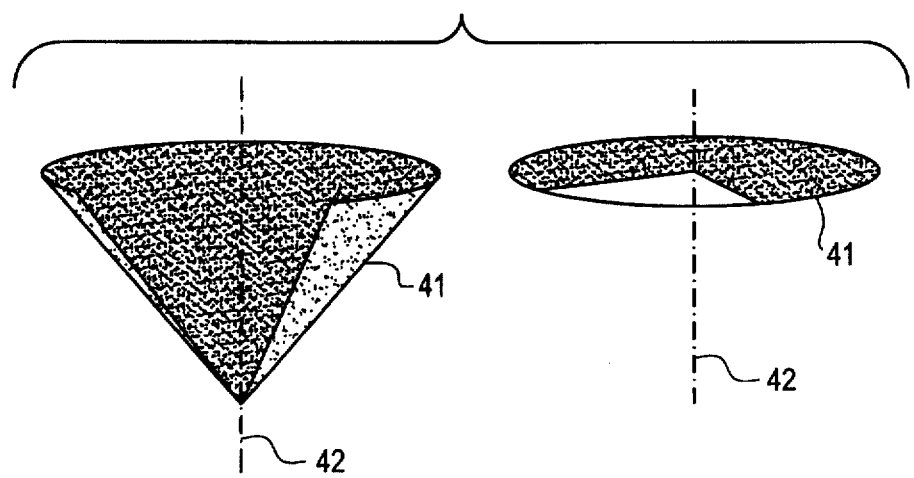
FIG. 5 shows a cone-shaped and a disk-shaped diaphragm part.

FIG. 5 shows that the diaphragm parts 41, rotating about axes of rotation 42, can be constructed to be shaped like a disk or else a cone, for example.

Figure 6:
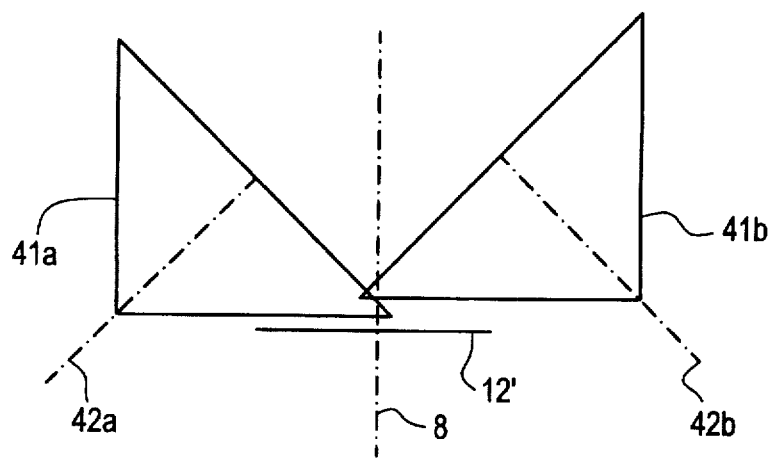
FIG. 6 shows a diaphragm having two conical diaphragm parts.

FIG. 6 shows that the axes of rotation 42a and 42b can also extend at an angle in relation to the optical axis 8.

Figure 7:
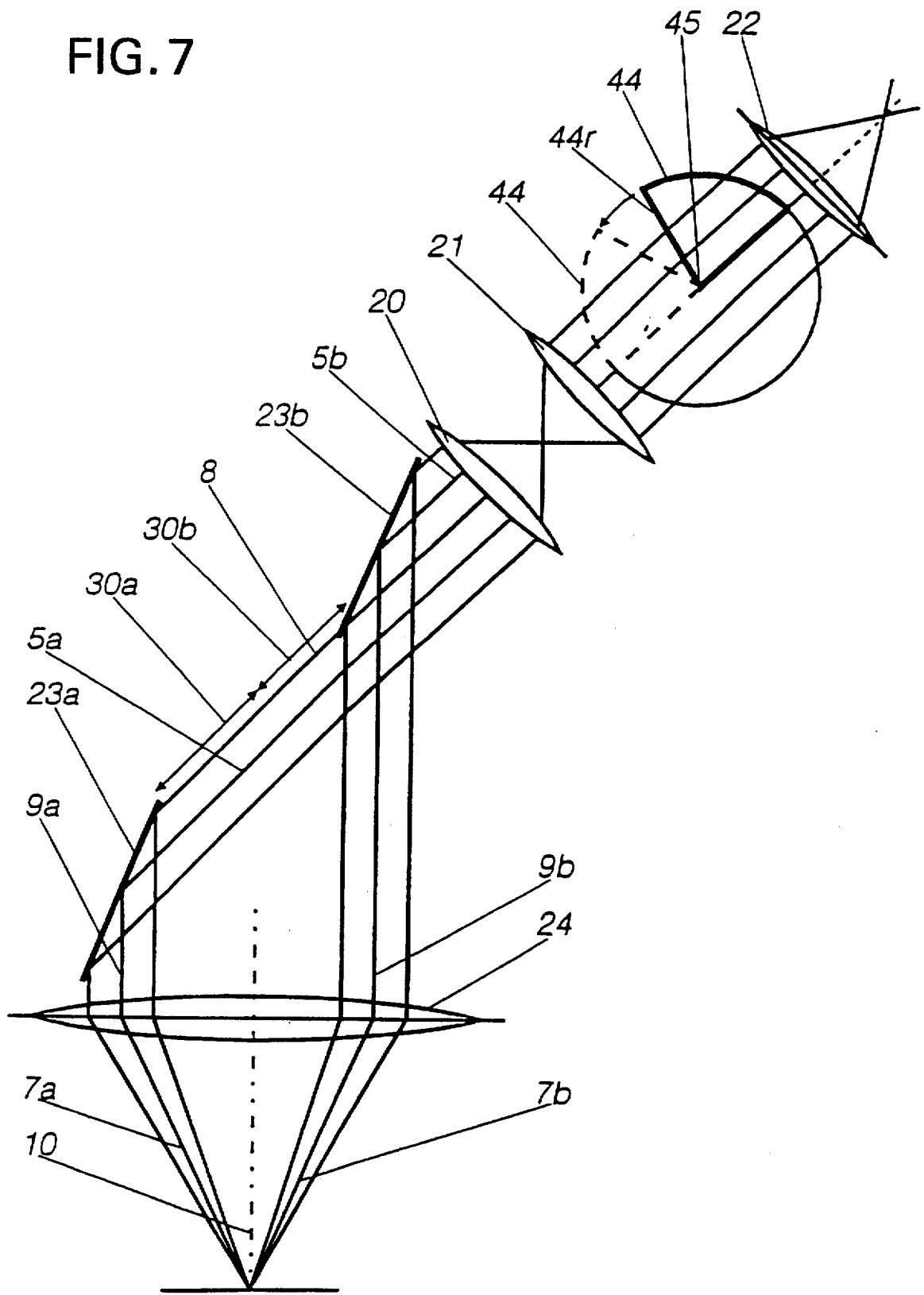
FIG. 7 shows a variant in which the axis of the common beam path is not at an angle to the axis of the main objective.

FIG. 7 shows an arrangement in which there is an angle of more than 90° between the axis 8 of the common optical system and the axis 10 of the main objective. In addition, the mirror edge lines at the axis 8 are essentially perpendicular to a plane defined by the axes 8 and 10. In order to adjust the stereo base, the two mirrors 23a, 23b are preferably constructed such that they can be displaced along the axis 8 on the movement ranges 30a and 30b. If the two mirrors 23a, 23b adjoin each other, what is imaged is essentially a total pupil composed of two partial pupils adjoining each other.

If appropriate, a partially cylindrical diaphragm 44 is provided in one pupil plane of the common beam path, said diaphragm being able to be rotated about an axis of rotation 45 intersecting the optical axis. In this arrangement, the axis of rotation is arranged transversely, preferably at right angles, in relation to the axis 8. The cylindrical part 44 must cover at least the entire common beam path in a first position. In order that a semicylinder is not needed, the cylinder radius 44r is selected to be larger than half the diameter of the common optical system. During the rotation of the cylindrical part 44 from the position drawn with continuous lines to the position drawn with dashed lines, one half of the beam is covered and the other half is exposed.

Figure 8:
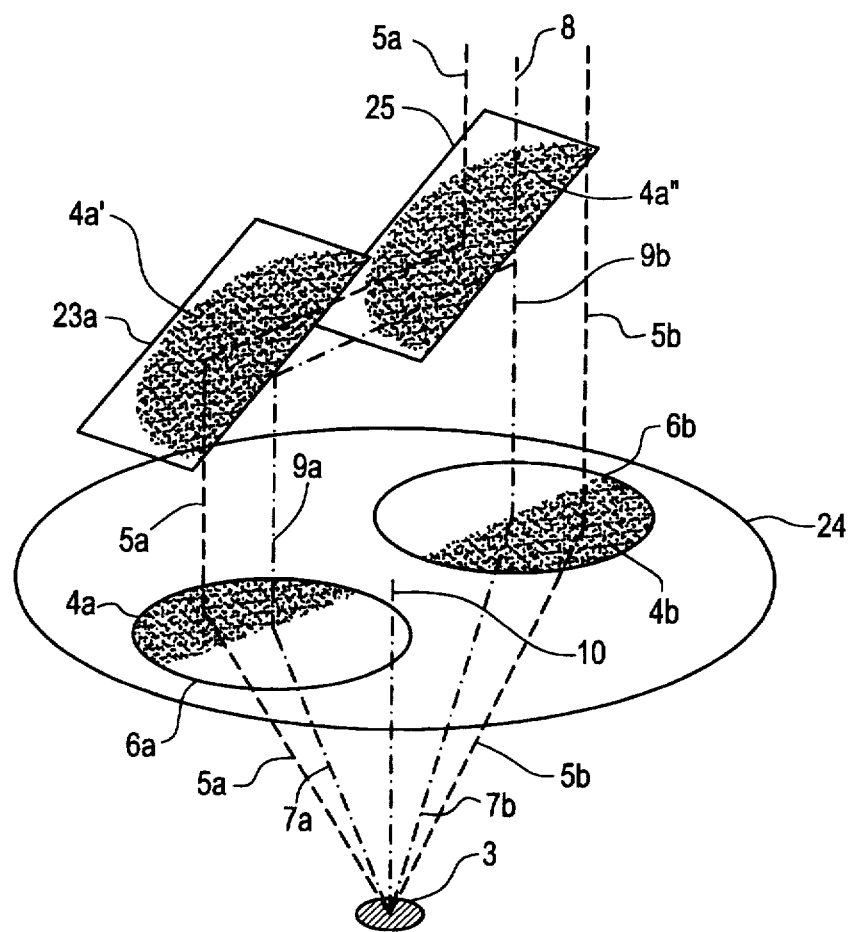
FIG. 8 shows a further variant in which mirrors are arranged only in one partial beam.

FIG. 8 shows an arrangement in which the common optical axis 8 extends parallel to the axis 10 of the main objective. The two superimposing mirrors 23a and 25 thus deflect the one or left beam twice through 90° in such a way that it comes to lie alongside the non-deflected second or right beam, or that the two partial pupils come to lie on either side of the common axis 8 and thus on either side of the axis 9b. The imaged partial pupil 4a' of the left beam path is drawn on the mirror 25. The bundles of light from the partial pupils 4a' and 4b pass into the common optical system.

Figure 9:
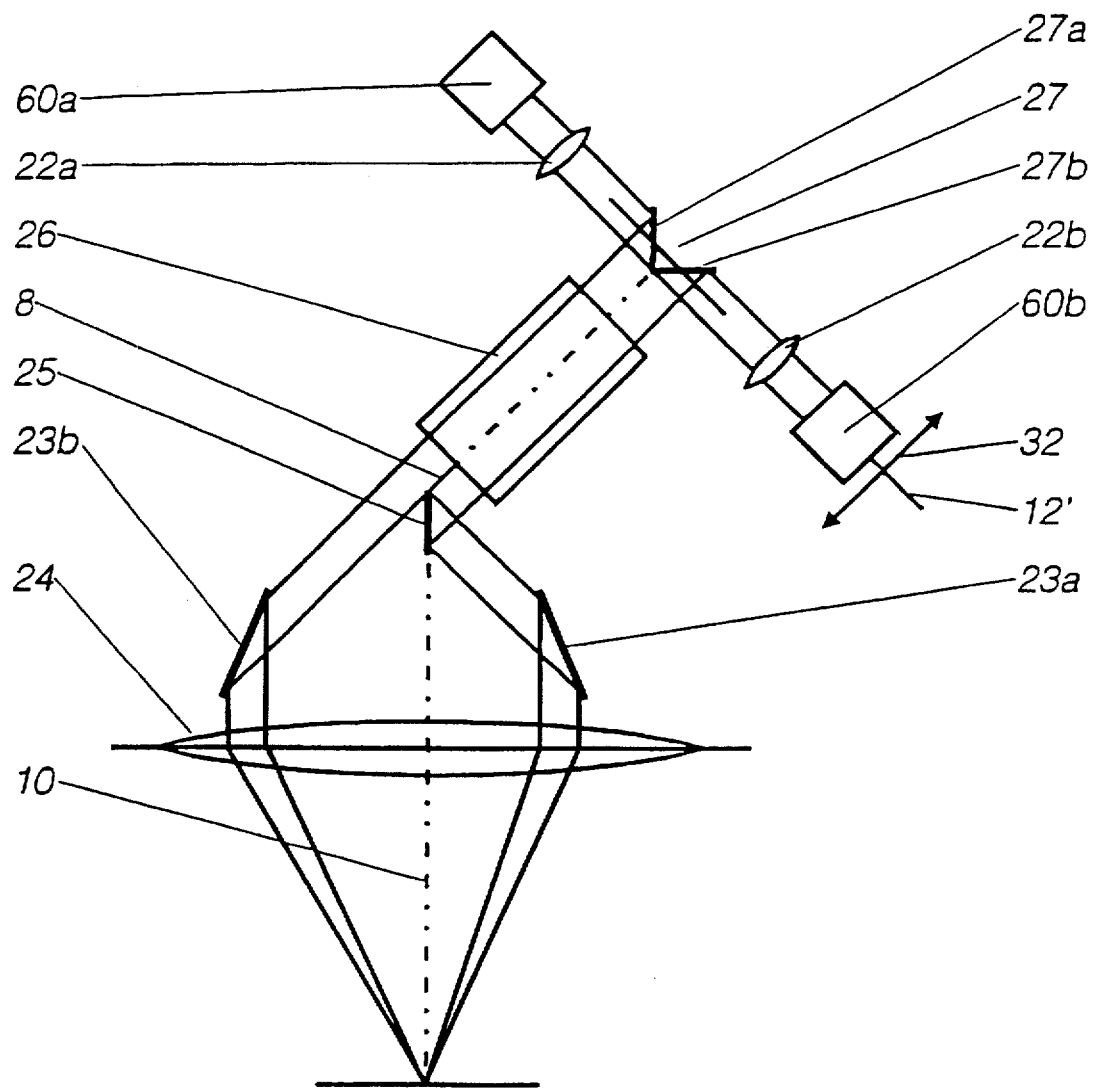
FIG. 9 shows a further variant in which the two partial beam paths are essentially equally long.

FIG. 9 shows an arrangement in which the two partial beam paths have substantially the same length. To this end, the two superimposing mirrors 23a and 23b are aligned with respect to each other such that the two partial beams deflected at the mirrors are incident on each other in the region of the axis of the main objective. In this region, at least one partial beam is deflected by a further mirror in such a way that partial pupils of the two beams lie alongside each other and the beams continue through the common optical system 26 along a common axis 8. At a pupil plane or conjugate pupil plane 12', the common beam is split into two partial beams, preferably by a separating device 27.

Since the partial pupils of the left and of the right stereoscopic partial beam lie on mutually opposite sides of the axis 8, it is possible to perform the separation, for example, using at least one separating mirror which is arranged in the region of the one partial pupils. In the arrangement illustrated, two separating mirrors 27a, 27b are provided. The two partial pupils are each imaged onto one image pick-up device 60a, 60b by these mirrors, for example by means of further optical elements, such as lenses 22a, 22b, for example. If an unequal number of reflections is provided in the two beam paths, the image information is preferably transformed in such a way that two images which can be superimposed and are not mirror-inverted are used to produce a stereo image.

Since the location of the pupil planes can change as a result of an adjustment of the common optical system, provision is preferably made for a tracking movement 32 or tracking device such that the separating device 27 always lies in the region of a desired conjugate pupil plane. Instead of a spatial separating device, a separation in time can also be provided, in particular by means of diaphragms. Accordingly, the tracking device is used to track the diaphragm.

In order to control the tracking device or displacement device, provision is preferably made for a control means which determines the current location of a pupil plane and controls the tracking device in such a way that the separating device is moved to the current pupil plane.

It goes without saying that in the case of embodiments according to the invention and having diaphragms, deflecting devices can in each case be used instead of the diaphragms. The partial pupils which are spatially separated in pupil planes of the common beam path are thus according to the invention either alternately covered using diaphragms or, using at least one separating mirror, clearly spatially separated or led away from the common axis 8. Instead of separating mirrors, it is also possible to use other elements, such as prisms, for example. However, it must be ensured that the loss of light remains as small as possible.

| LIST OF REFERENCE SYMBOLS | |
| --- | --- |
| 3 | Object |
| 4a, b | Semicircular partial pupils of the left and right beam path |
| 5a, b | Central ray of the left and right beam path |
| 6a, b | Pupil of the left and right beam path |
| 7a, b | Optical axis of the left and right beam path between object and main objective |
| 9a, b | Optical axis of the left and right beam path between main objective and superimposing device |
| 8 | Axis of the common beam path |
| 10 | Optical axis of the main objective |
| 11 | Intermediate image plane (conjugate) |
| 12 | Pupil plane |
| 12' | Conjugate pupil plane |
| 12'a, b | Conjugate pupil plane of the left and right beam path |
| 20, 21, 22 | Lenses |
| 23a | Pupil-splitting mirror, movable |
| 23b | Pupil-splitting mirror, fixed |
| 24 | Main objective |
| 25 | Second superimposing mirror of the left beam path |
| 26 | Common optical system |
| 27 | Deflecting device with two separating mirrors |
| 27a, b | Separating mirror of the left and right beam path |
| 30 | Movement of the pupil-splitting mirror |
| 31 | Movement of the main objective |
| 32 | Movement of the separating device |
| 41, 41a, b | Rotating diaphragms |
| 42 | Diaphragm axes |
| 43 | Fixed additional diaphragm |
| 44 | Cylindrical part diaphragm |
| 45 | Axis of the cylindrical part diaphragm |
| 60 | Image pick-up device |
| 61 | Synchronization device between diaphragm and image pick-up device |

What is claimed is:

1. A stereomicroscope comprising:

a main objective;

a superposition device having at least two spatially separate superposing mirrors which are arranged in a beam path of the main objective such that two spatially separate beams are simultaneously superposed in a common beam path to form two superposed light beams;

a separating device to separate the two superposed light beams;

at least one camera device to which in an operating state only one image is sent by one or the other of the two superposed light beams at least at given time intervals; and a common optic which projects images of the two superposing mirrors onto the separating device such that the two superposed light beams are at least partially separated spatially in the separating device.

2. A stereomicroscope according to claim 1, wherein the superposing mirrors are at an angle of substantially 45 degrees to a main objective axis and aligned parallel to one another, and are shifted from one another both in a direction along an optical axis of a common beam path, and in a direction perpendicular to the common axis, and each has one boundary line, the boundary lines lying on both sides of a plane subtended by the common axis and the main objective axis.

3. A stereomicroscope according to claim 1, wherein the superposing mirrors are in a substantially parallel beam path of a first partial beam such that the mirrors deflect the first partial beam such that a partial pupil of this first partial beam comes to lie, with respect to a common axis, in mirror-image relationship to a second partial beam on the superposing mirrors.

4. A stereomicroscope according to claim 1, wherein the superposition device includes at least three superposing mirrors with partial pupils, two of the at least three mirrors deflecting two partial beams along separate, substantially equally long paths, to a superposition area where at least one superposing mirror makes the partial beams able to be introduced into the common optic.

5. A stereomicroscope according to claim 1, wherein the separating device comprises at least one separating element which, when an essentially undistorted image is supplied to an image pick-up device in one pupil plane, is arranged only in the region of one partial pupil of a stereoscopic beam path, and hence in one part of a passage cross-section of a common beam path.

6. A stereomicroscope according to claim 5, wherein the separating device includes a diaphragm device, and the at least one separating element includes a movable diaphragm element which alternately makes it possible to cover at least one partial pupil.

7. A stereomicroscope according to claim 6, wherein the diaphragm device comprises two parts which rotate synchronously about two axes of rotation and which have passage regions which alternately essentially expose one half of the common beam path and cover the other half.

8. A stereomicroscope according to claim 6, wherein the movable diaphragm element includes a semicylinder and can be rotated about an axis of rotation which lies essentially in a plane normal to the optical axis of the common beam path and on the central perpendicular to a connecting line between centers of two partial pupils, in such a manner that at least a bundle of light from one partial beam is covered.

9. A stereomicroscope according to claim 5, wherein the separating device is a deflecting device and with at least one deflecting element, which is essentially arranged in a pupil plane in a region of a partial pupil of a stereoscopic beam path, and which deflects one partial beam path and makes it possible to supply two partial beams to separate image pick-up devices.

10. A stereomicroscope according to claim 1, wherein the separating device is displaceable along an axis of a common beam path and further comprising a control unit and a displacing device, the control unit determining the current location of a pupil plane and the displacing device permitting the separating device to be positioned at the location determined.

11. A stereomicroscope according to claim 1, further comprising an adjusting device for adjusting the stereo base, which device makes it possible to displace at least one superposing mirror in parallel fashion essentially along an axis of the common beam path and makes it possible to displace the main objective in parallel fashion such that two partial beams which pass into the common optic lead through partial regions of the main objective which are arranged essentially symmetrically with respect to a main objective axis.

* * * * *